US012115840B2

United States Patent
Henne (10) Patent No.: US 12,115,840 B2
(45) Date of Patent: Oct. 15, 2024

(54) AIR VENT FOR A VEHICLE (71) Applicant: DAIMLER AG, Stuttgart (DE)

(72) Inventor: Reinhold Henne, Haigerloch (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 465 days.

(21) Appl. No.: 17/610,801

(22) PCT Filed: Apr. 28, 2020

(86) PCT No.: PCT/EP2020/061788
§ 371 (c)(1),
(2) Date: Nov. 12, 2021

(87) PCT Pub. No.: WO2020/229166
PCT Pub. Date: Nov. 19, 2020

(65) Prior Publication Data
US 2022/0203807 A1     Jun. 30, 2022

(30) Foreign Application Priority Data
May 13, 2019   (DE) .................... 10 2019 003 359.0

(51) Int. Cl.
*B60H 1/34* (2006.01)
*B60Q 3/20* (2017.01)
*B60Q 3/64* (2017.01)

(52) U.S. Cl.
CPC ............. *B60H 1/3435* (2013.01); *B60Q 3/20* (2017.02); *B60Q 3/64* (2017.02)

(58) Field of Classification Search
CPC ........... B60H 1/3435; B60Q 3/20; B60Q 3/64
(Continued)

(56) References Cited

U.S. PATENT DOCUMENTS

| 10,023,021 B2 * | 7/2018 | Weber ..................... F24F 13/06 |
| 2008/0112155 A1 * | 5/2008 | Scown ..................... B60Q 3/44 |
| | | 362/96 |

(Continued)

FOREIGN PATENT DOCUMENTS

| CN | 2598081 Y | 1/2004 |
| CN | 109515120 A | 3/2019 |

(Continued)

OTHER PUBLICATIONS

JP-3125358-U Sep. 14, 2006 Xu Mingde Light guiding module used for automobile (Year: 2006).*
(Continued)

Primary Examiner — Edelmira Bosques
Assistant Examiner — Frances F. Hamilton
(74) Attorney, Agent, or Firm — PATENT PORTFOLIO BUILDERS PLLC (57) ABSTRACT An air vent for a vehicle includes a housing and an air guiding element that is pivotable relative to the housing about a pivot axis extending transversely to a direction of flow predetermined by the channel. A light source is arranged outside the air guiding element and a light guide is optically coupled to the light source. A first section of the light guide is guided in the region of the pivot axis from the outside of the air guiding element through a wall thereof to the inside and in this section the light guide extends coaxially to the pivot axis. Outside the air guiding element, a second section of the light guide adjoins the first section of the light guide in the direction of the light source. The first section is angled 90° relative to the second section and a chamfer formed on an outer side of the angled portion has a mirror surface directed towards an inner side of the angled portion.

7 Claims, 7 Drawing Sheets (58) Field of Classification Search
USPC .......................................................... 454/155
See application file for complete search history.

(56)  References Cited

U.S. PATENT DOCUMENTS

| | | | | |
|---|---|---|---|---|
| 2009/0298406 | A1* | 12/2009 | Norbury, Jr. ............. | B60Q 3/64 |
| | | | | 454/145 |
| 2014/0340920 | A1* | 11/2014 | Bayersdorfer ........... | B60Q 3/54 |
| | | | | 362/511 |
| 2016/0185286 | A1* | 6/2016 | Cazenave ................ | B60Q 3/51 |
| | | | | 362/511 |
| 2018/0056758 | A1* | 3/2018 | Salter ...................... | A61L 9/205 |
| 2021/0155351 | A1* | 5/2021 | Jha .......................... | B60Q 3/64 |
| 2022/0009317 | A1* | 1/2022 | Groben ................ | B60H 1/3435 |
| 2022/0194178 | A1* | 6/2022 | Henne ..................... | B60Q 3/20 |

FOREIGN PATENT DOCUMENTS

| | | | | |
|---|---|---|---|---|
| DE | 19702174 A1 * | 7/1998 | ............. | B60Q 3/004 |
| DE | 10332158 A1 * | 2/2005 | ................ | B60Q 3/62 |
| DE | 102013113319 B3 * | 11/2014 | ........ | B60H 1/00207 |
| DE | 102014018302 A1 | 6/2016 | | |
| DE | 102016003974 A1 | 9/2016 | | |
| DE | 102015115365 A1 | 3/2017 | | |
| EP | 1832452 A2 | 9/2007 | | |
| EP | 2881273 A1 * | 6/2015 | ........... | B60H 1/3414 |
| EP | 3103664 A1 * | 12/2016 | ........... | B60H 1/3435 |
| GB | 1310493 A * | 3/1973 | | |
| JP | 2002036864 A | 2/2002 | | |
| JP | 2010137816 A * | 6/2010 | | |
| JP | 2010143338 A * | 7/2010 | ........... | B60Q 3/0243 |
| JP | 2013154735 A * | 8/2013 | | |
| KR | 101468083 B1 * | 6/2012 | | |
| WO | WO-2012013819 A1 * | 2/2012 | ......... | B60H 1/00985 |
| WO | WO-2013023165 A1 * | 2/2013 | ........... | B60H 1/3421 |

OTHER PUBLICATIONS

International Search Report mailed Aug. 4, 2020 in related/corresponding International Application No. PCT/EP2020/061788.
Office Action created Dec. 20, 2019 in related/corresponding DE Application No. 10 2019 003 359.0.
Written Opinion mailed Aug. 4, 2020 in related/corresponding International Application No. PCT/EP2020/061788.
Office Action dated Mar. 27, 2024 in related/corresponding CN Application No. 2020800356024.

* cited by examiner

AIR VENT FOR A VEHICLE

BACKGROUND AND SUMMARY OF THE INVENTION

Exemplary embodiments of the invention relate to an air vent for a vehicle.

DE 10 2016 003 974 A1 discloses an air vent for a vehicle, which comprises a housing having a channel through which air can pass, via which the air can be conveyed to an interior space of the vehicle. An air guiding element for guiding the air is also provided, which element is movable relative to the housing and has a luminous element fixed to the housing, by means of which light can be provided for illuminating the air guiding element. One part of the air guiding element which is movable relative to the luminous element is formed as a light guide, into which the light provided can be coupled in.

JP 2010 143 338 A describes an air vent for a vehicle, having a channel and a plurality of air guiding elements each of which can be pivoted relative to a housing and about a pivot axis extending transversely to a direction of flow predetermined by the channel. An air guiding element is coupled to a light guide extending coaxially to the pivot axis inside the air guiding element and which is coupled to a light source arranged outside the air guiding element.

US 2009/0298406 A1 discloses an air vent comprising a base and a louvre coupled to the base, which is designed to influence the direction of a fluid passing through the air vent. The air vent also comprises one or more light sources coupled to the base for illuminating the air vent.

DE 10 2014 018 302 A1 describes a ventilating device for a motor vehicle, comprising a housing having an air duct and an air outlet. An air guiding element for adjusting an air flow is movably arranged in the housing, wherein the air guiding element has a visible side with a luminous surface. Furthermore, a luminous element is provided, with the help of which the luminous surface of the air guiding element can be illuminated. The housing comprises a bearing with a bearing surface on which the air guiding element is rotatably and pivotably arranged. The bearing has a light coupling-out region. The air guiding element consists in sections of light-conducting material, which comprises a light coupling-in region connected to the luminous surface in a light-guiding manner, wherein the light coupling-in region of the air guiding element and the light coupling-out region of the bearing are arranged relative to one another in such a way that light from the light coupling-out region of the bearing can be coupled in into the light coupling-in region of the air guiding element. The ventilating device is designed as a ball nozzle, wherein support struts are arranged in the housing to support an axle extending along an axis of symmetry. The bearing on which the air guiding element is rotatably and pivotably mounted is provided at an end of the axle facing the air outlet.

Exemplary embodiments of the invention are directed to an air vent for a vehicle which is improved over the prior art.

An air vent for a vehicle comprises a housing having a channel through which air can pass, via which the air can be conveyed to an interior space of the vehicle. Moreover, the air vent comprises at least one air guiding element, which is pivotable relative to the housing about a pivot axis extending transversely to a direction of flow predetermined by the channel, at least one light source arranged outside the air guiding element, and at least one light guide optically coupled to the light source. A first section of the light guide is guided in the region of the pivot axis from the outside of the air guiding element through a wall thereof to the inside and in this section the light guide extends coaxially to the pivot axis. Outside the air guiding element, a second section of the light guide adjoins the first section of the light guide in the direction of the light source, wherein the first section is angled at an angle of 90° to the second section and a chamfer is formed on an outer side of the angled portion, which chamfer has a mirror surface directed towards an inner side of the angled portion.

Due to the angled design of the light guide, this can be guided in the region of the pivot axis of the air guiding element towards the inside thereof, without a pivot region of the air guiding element being restricted. The arrangement of the mirror surface in the region of the chamfer allows an at least almost loss-free light deflection at the angled portion. The light guide allows the illumination of the air vent or of sections thereof, for example an indirect illumination, without the light source being visible to a vehicle occupant. Here, light can be emitted in a color, for example, which correlates to a change in the desired temperature. In the event, for example, of a desired lowering of the desired temperature, light with a blue color is emitted, and in the event of a desired increase in the desired temperature, light with a red color is emitted. The light color can also be selected to influence the well-being of a vehicle occupant.

According to the invention, the air guiding element is formed as a cylindrical outer air guiding element and the wall of the outer air guiding element surrounds a wall of a cylindrical inner air guiding element. With such an arrangement, the illumination of the inner air guiding element by means of the light guide is possible.

In one possible embodiment of the air vent, the chamfer is arranged at an angle of 45° to sections of the light guide respectively adjoining the chamfer. This allows an effective deflection of the light inside the light guide.

In a further possible embodiment of the air vent, at least one third section of the light guide adjoins the first section inside the air guiding element, wherein the third section has a light coupling-out surface at least in sections. The third section allows the coupling out of light on the inside of the air guiding element or from the air guiding element.

In a further possible embodiment of the air vent, the at least one third section extends at least substantially parallel to an inner periphery or an inner peripheral section of the wall of the air guiding element. Thus, a uniform coupling out of the light can take place along the inner periphery or along inner peripheral sections.

In a further possible embodiment of the air vent, the at least one third section is coupled to the first section by means of a hinge and is pivotable about the pivot axis of the air guiding element. This allows the at least one third section to be pivoted together with the air guiding element and therefore the movement of the air guiding element is not restricted. To this end, the at least one third section is attached to the inner side of the wall of the air guiding element, for example, and is therefore forcibly guided by the latter during the pivoting thereof.

In a further possible embodiment of the air vent, arranged on a side of the air guiding element that is opposite the light guide is a further light guide, which is designed analogously thereto and is optically coupled to the light source or a further light source, the first section of which is guided in the region of the pivot axis from the outside of the air guiding element through the wall thereof to the inside and extends coaxially to the pivot axis. Such an arrangement of a further light guide allows illuminations of the air vent at a plurality of positions as well as a uniform and extensive illumination.

In a further possible embodiment of the air vent, the inner air guiding element is pivotable relative to the outer air guiding element and the housing about a pivot axis extending transversely to the direction of flow predetermined by the channel, wherein the pivot axis extends perpendicularly to the pivot axis of the outer air guiding element. The inner air guiding element is, in particular, pivotably mounted on the outer air guiding element. This design allows a wide range of adjustment possibilities for a vehicle occupant in terms of air guidance and outflow directions. For example, the pivot axis of the outer air guiding element extends in the direction of a transverse axis of the vehicle and the pivot axis of the inner air guiding element extends in the direction of a vertical axis of the vehicle.

In a further possible embodiment of the air vent, the at least one third section of the at least one light guide couples out light in the direction of the outside of the inner air guiding element. This creates an indirect illumination of the inner air guiding element, which allows, among other things, a vehicle occupant to easily locate and operate the air vent in the dark.

In a further possible embodiment of the air vent, the wall of the outer air guiding element is mirrored on the inner side thereof. This allows special lighting effects to be achieved, in particular a very uniform illumination.

In a further possible embodiment of the air vent, the inner air guiding element is designed to be transparent or is mirrored at least on an outer side of the wall. This can also be used to achieve special lighting effects, such as the appearance of a self-illumination of the inner air guiding element or a very uniform illumination. For example, in this way the inner air guiding element can serve or appear as a luminous body.

Embodiment examples of the invention will be described in more detail in the following on the basis of drawings.

BRIEF DESCRIPTION OF THE DRAWING FIGURES

In the drawings:

FIG. 1 schematically shows a front view of an air vent arrangement of an air vent, FIG. 2 schematically shows a sectional view of an air vent, FIG. 3 schematically shows an enlarged section of the sectional view according to FIG. 2, FIG. 4 schematically shows a section of a light guide of the air vent according to FIG. 2, FIG. 5 schematically shows a perspective view of an air guiding element and an illumination device of the air vent according to FIG. 2 in an unpivoted position, FIG. 6 schematically shows a perspective view of the illumination device according to FIG. 5 in the unpivoted position, FIG. 7 schematically shows a perspective view of the air guiding element and the illumination device according to FIG. 5 in a pivoted position and FIG. 8 schematically shows a perspective view of the illumination device according to FIG. 7 in the pivoted position.

Corresponding parts have been provided with the same reference numbers in all of the drawings.

DETAILED DESCRIPTION

Figure 1:
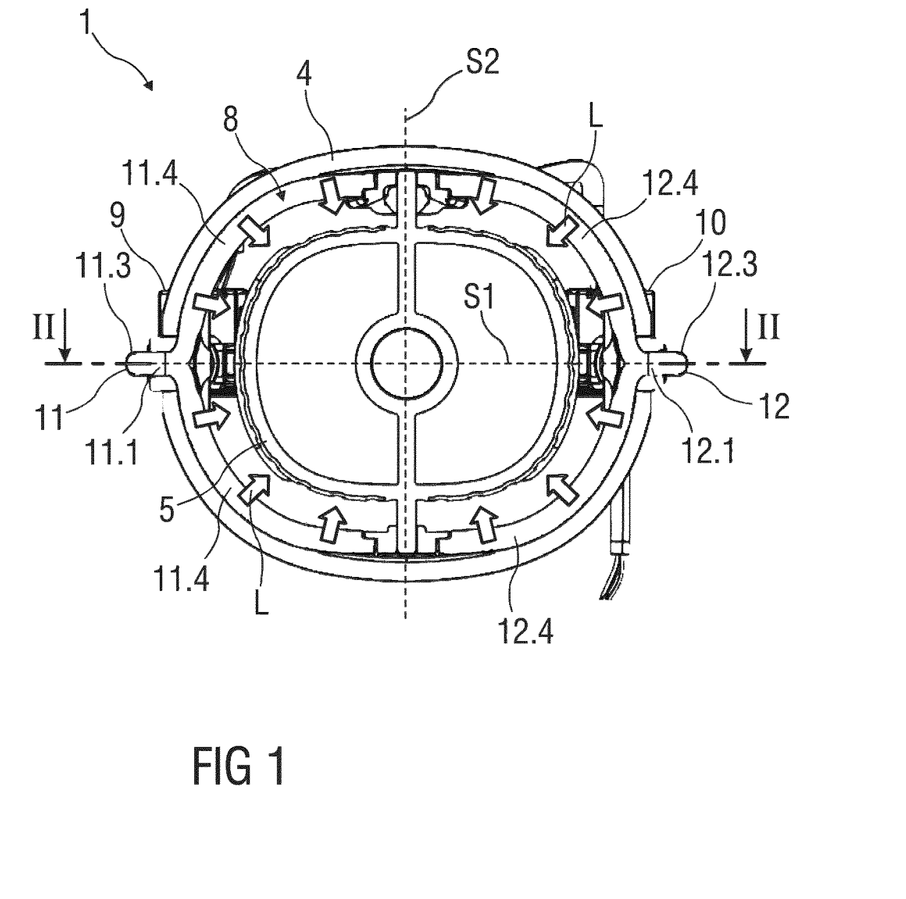
Figure 2:
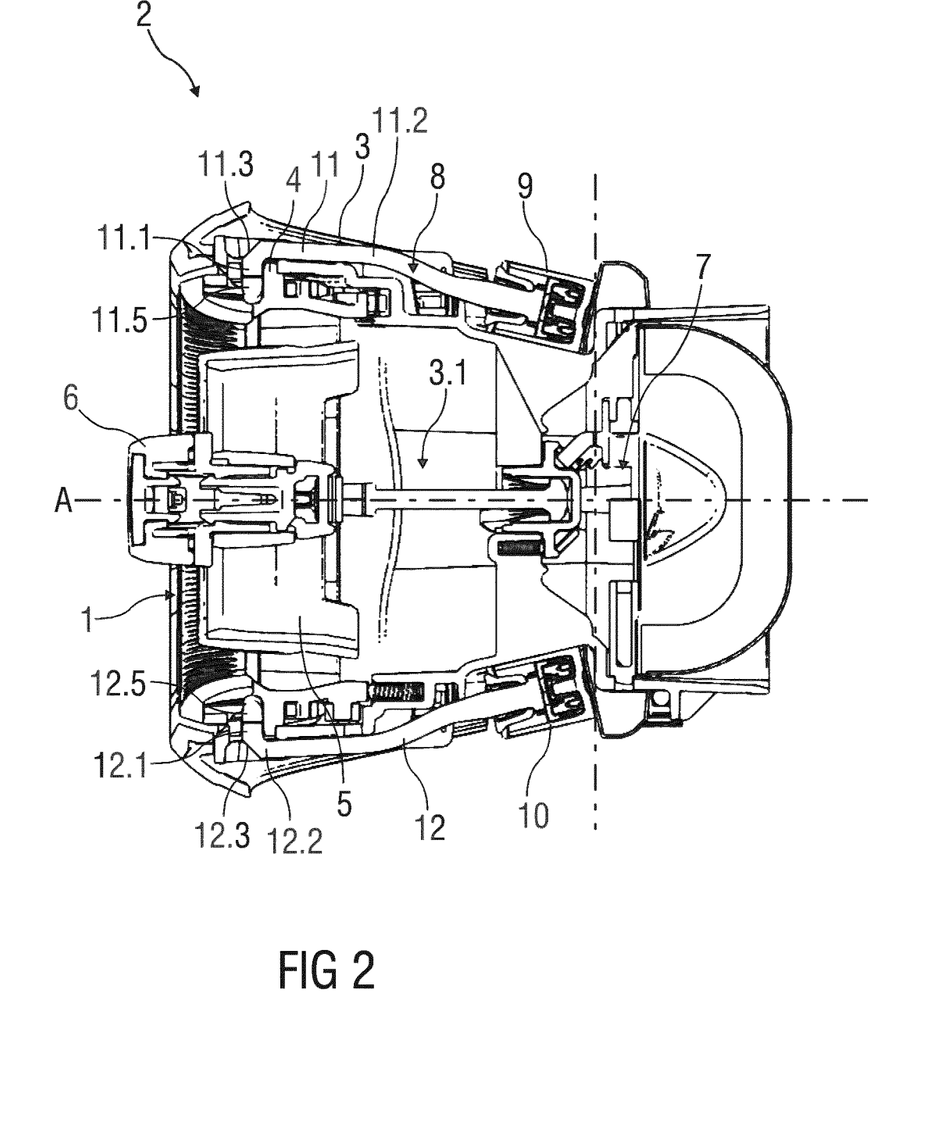
Figure 3:
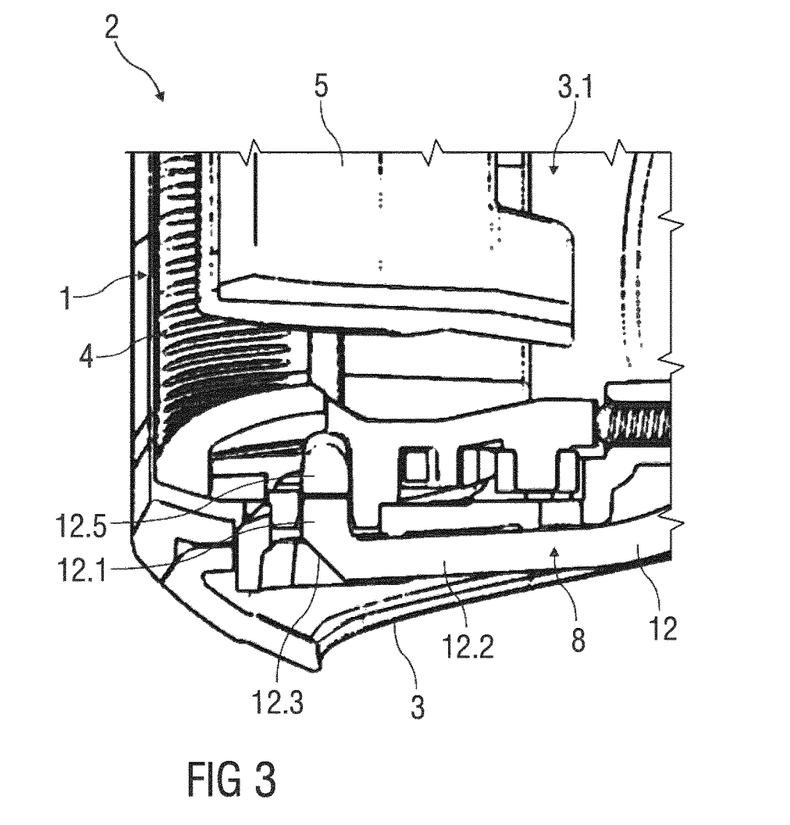

FIG. 1 shows a front view of one possible embodiment example of an air vent arrangement 1 of an air vent 2 shown in FIG. 2 for a vehicle. FIG. 2 shows a sectional view of one possible embodiment example of an air vent 2 having the air vent arrangement 1 according to FIG. 1, and FIG. 3 shows an enlarged section of the sectional view according to FIG. 2.

The air vent 2 comprises a housing 3 having a channel 3.1 through which air can pass, via which the air can be conveyed to an interior space of the vehicle.

Arranged inside the housing 3 is the air vent arrangement 1, which comprises a cylindrical outer air guiding element 4 and an inner cylindrical air guiding element 5.

The outer air guiding element 4 is pivotable relative to the housing 3 about a pivot axis S1 extending transversely to a direction of flow predetermined by the channel 3.1.

The inner air guiding element 5 is pivotable relative to the outer air guiding element 4 and the housing 3 about a pivot axis S2 extending transversely to the direction of flow predetermined by the channel 3.1. This pivot axis S2 extends perpendicularly to the pivot axis S1 of the outer air guiding element 4, wherein the inner air guiding element 5 is pivotably mounted in the outer air guiding element 4. The pivoting of the air guiding elements 4, 5 brings about a change in the outflow direction of the air.

To operate the air control elements 4, 5, these are coupled to a central control element 6, wherein a pivoting movement of the control element 6 causes a corresponding pivoting movement of the air guiding elements 4, 5.

In addition, the control element 6 is coupled to a valve assembly 7, wherein a rotational movement of the control element 6 about its axis A triggers an activation of the valve assembly 7 and therefore a change in the free cross section of the channel 3.1.

Moreover, the air vent 2 comprises an illumination device 8, which is shown in detail in FIGS. 5 to 8 and which is designed to couple out light L from the outer air guiding element 4 in the direction of the inner air guiding element 5 and therefore to indirectly illuminate the inner air guiding element 5.

For this, the illumination device 8 comprises two light sources 9, 10, for example light-emitting diodes, which are arranged outside the outer air guiding element 4. The light sources 9, 10 are designed to emit light L in different colors. The color of the light L can be freely selected by a vehicle occupant, for example, or it is set automatically.

In order to couple out the light L of the light sources 9, 10 in the direction of the inner air guiding element 5, the illumination device 8 comprises two light guides 11, 12 each of which are optically coupled to one of the light sources 9, 10. The light sources 9, 10 couple in the light L into the coupled light guides 11, 12.

In order to guide the light guides 11, 12 from the outside of the outer air guiding element 4 through a wall thereof to the inside, the light guides 11, 12 each comprise a first section 11.1, 12.1, which is guided in the region of the pivot axis S1 of the outer air guiding element 4 from the outside of the outer air guiding element 4 through the wall thereof to the inside and extends coaxially to the pivot axis S1.

Figure 4:
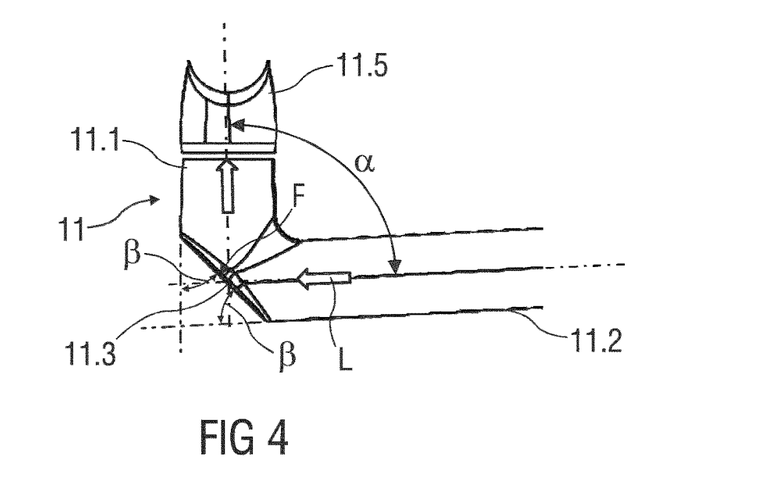

This is shown in detail for the light guide 11 in FIG. 4 and applies analogously to the light guide 12.

Outside the outer air guiding element 4, second sections 11.2, 12.2 of the light guides 11, 12 adjoin the first sections 11.1, 12.1 of the light guides 11, 12 in the direction of the respective light sources 9, 10 and are each optically coupled to one of the light sources 9, 10. To deflect the light guides 11, 12, the first sections 11.1, 12.1 are each angled at an angle α of 90° to the corresponding second section 11.2, 12.2.

A chamfer 11.3, 12.3 is formed on each light guide 11, 12 on an outer side of the angled portion. The chamfers 11.3, 12.3 are each arranged at an angle β of 45° to adjoining sections 11.1, 11.2, 12.1, 12.2 of the corresponding light guide 11, 12.

In order to avoid the coupling out of light L in the region of the angled portion, the chamfers 11.3, 12.3 each have a mirror surface F directed towards an inner side of the angled portion.

Inside the outer air guiding element 4, two third sections 11.4, 12.4 of the light guides 11, 12 are coupled to the first sections 11.1, 12.1 of the light guides 11, 12. The coupling takes place by means of a hinge 11.5, 12.5, such that the third sections 11.4, 12.4 are pivotable about the pivot axis S1 of the outer air guiding element 4.

The third sections 11.4, 12.4 extend substantially parallel to an inner peripheral section of the wall of the outer air guiding element 4, in particular to an inner peripheral section corresponding to approximately ¼ of an inner periphery of the outer air guiding element 4. The third sections 11.4, 12.4 are attached to the outer air guiding element 4.

The third sections 11.4, 12.4 of the light guides 11, 12 each comprise a light coupling-out surface, such that these couple out light L at least almost completely in the direction of the outside of the inner air guiding element 5.

To create special light effects, for example to create the appearance of a self-illumination of the inner air guiding element 5, such that this appears as a luminous body, in one possible embodiment the inner air guiding element 5 is designed to be transparent, for example as a glass body. Alternatively, the inner air guiding element 5 is mirrored on the illuminated outer side thereof.

The outer air guiding element 4 is also mirrored on the inner side thereof, for example.

Figure 5:
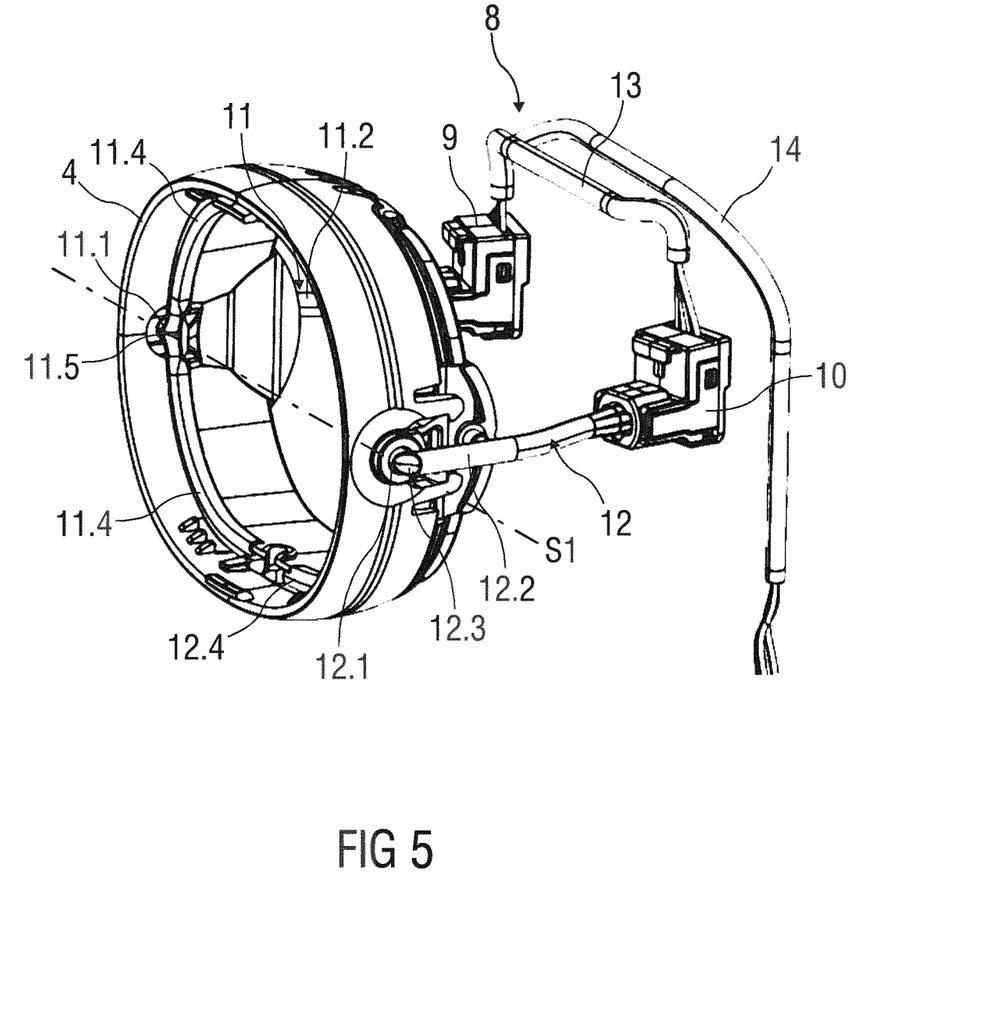
Figure 6:
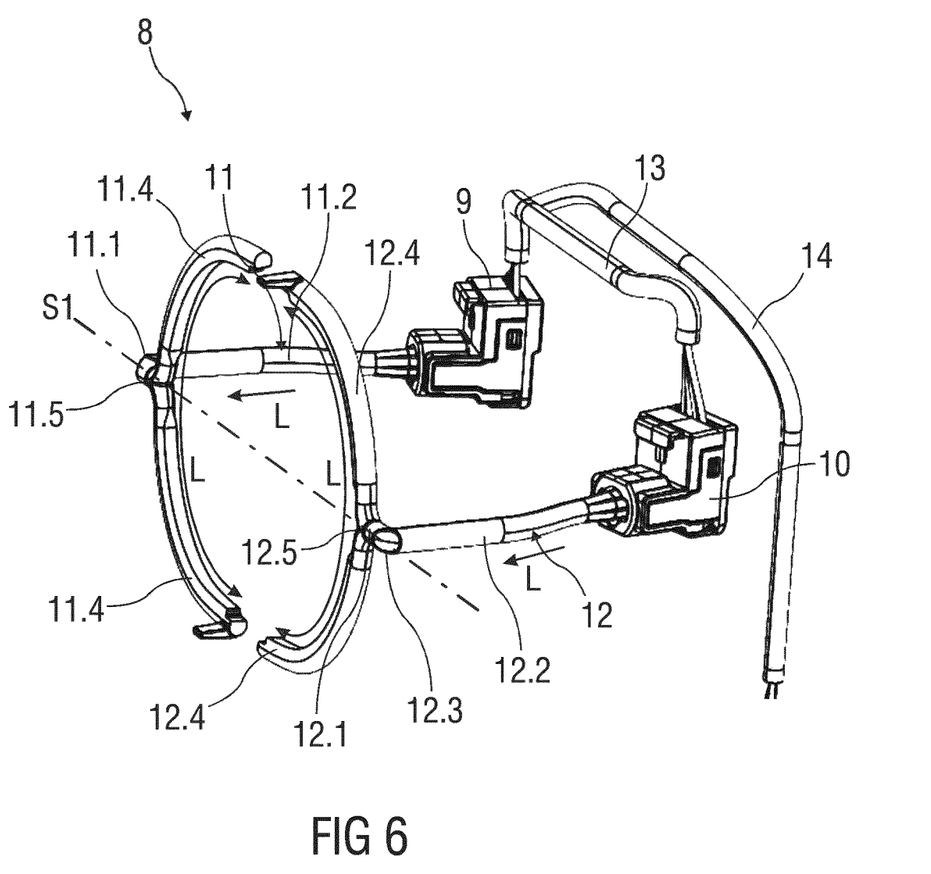

FIG. 5 shows a perspective view of the outer air guiding element 4 and the illumination device 8 of the air vent 2 according to FIG. 2 in an unpivoted position. FIG. 6 shows a perspective view of the illumination device 8 according to FIG. 5 in the unpivoted position.

The two light sources 9, 10 are coupled to one another both electrically and via data technology via a first cable connection 13 and they are coupled to a control unit (not shown) both electrically and via data technology via a second cable connection 14.

Figure 7:
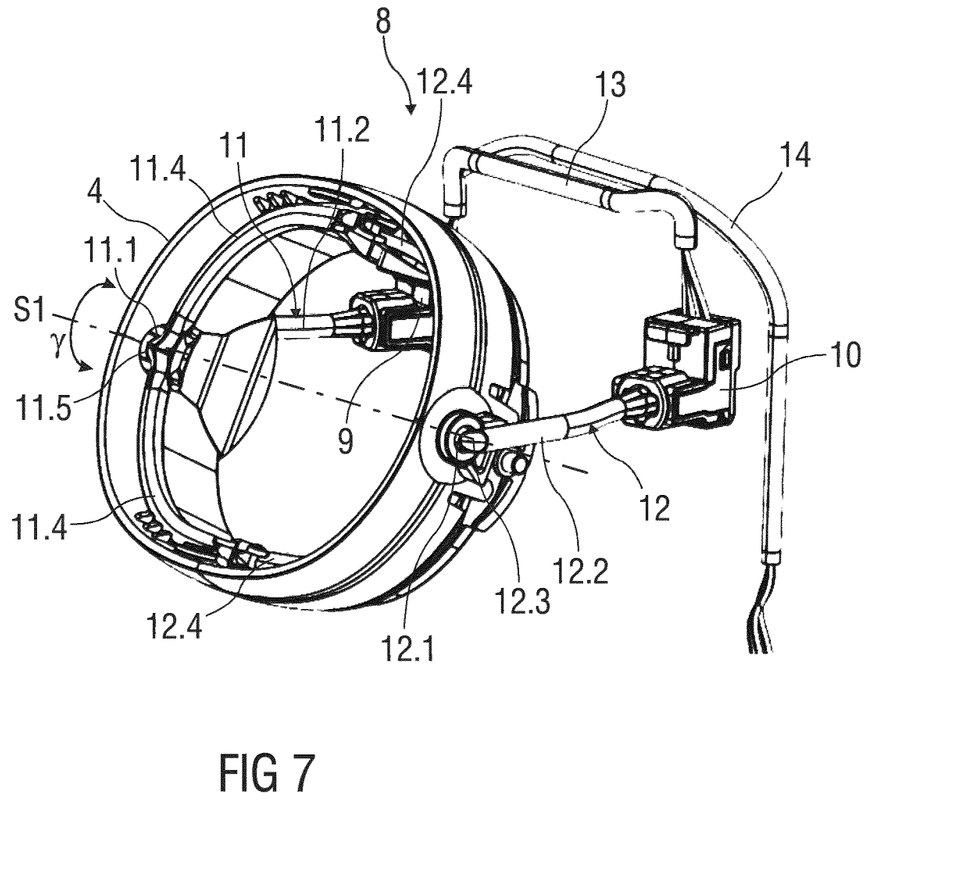
Figure 8:
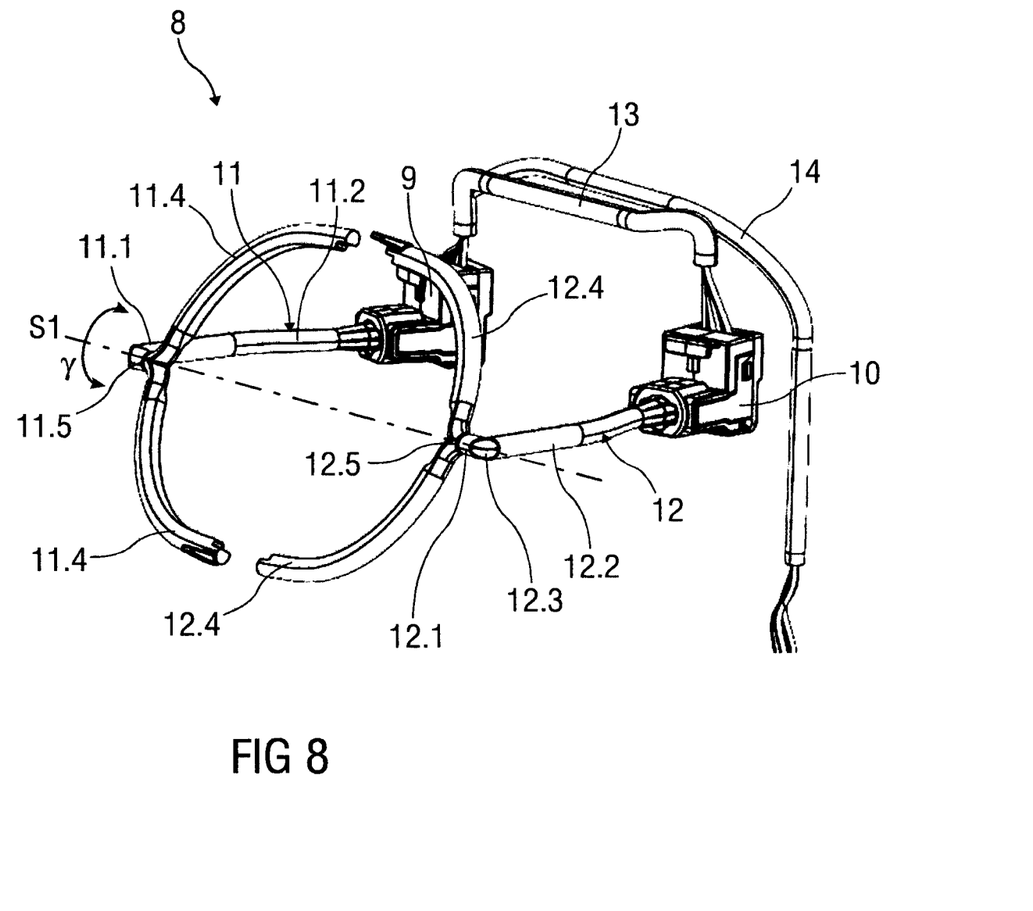

FIG. 7 shows a perspective view of the outer air guiding element 4 and the illumination device 8 of the air vent 2 according to FIG. 2 in a pivoted position. FIG. 8 shows a perspective view of the illumination device 8 according to FIG. 7 in the pivoted position.

The outer air guiding element 4 and the third sections 11.4, 12.4 of the light guides 11, 12 are pivoted by an angle γ about the pivot axis S1. A pivot by +/−25° is possible, for example.

The joint pivoting of the outer air guiding element 4 and the third sections 11.4, 12.4 is facilitated by the hinges 11.5, 12.5, wherein in the event of a pivot of the outer air guiding element 4, the third sections 11.4, 12.4 are forcibly guided by the latter on account of their attachment thereto.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An air vent for a vehicle, the air vent comprising:
a housing having a channel through which air can pass and be conveyed to an interior space of the vehicle;
at least one air guiding element, which is pivotable relative to the housing about a pivot axis extending transversely to a direction of flow defined by the channel;
at least one light source arranged outside the at least one air guiding element;
at least one light guide optically coupled to the at least one light source,
wherein a first section of the light guide is guided in a region of the pivot axis from the outside of the at least one air guiding element through a wall of the at least one air guiding element to an inside of the at least one air guiding element,
wherein in the first section the at least one light guide extends coaxially to the pivot axis, wherein a second section of the at least one light guide, which is outside the at least one air guiding element, adjoins the first section of the at least one light guide in a direction of the light source,
wherein the first section is arranged at an angle of 90° to the second section to form an angled portion,
wherein a chamfer is formed on an outer side of the angled portion, wherein the chamfer has a mirror surface directed towards an inner side of the angled portion,
wherein the at least one air guiding element is a cylindrical outer air guiding element and the wall of the at least one air guiding element surrounds a wall of a cylindrical inner air guiding element,
wherein at least one third section of the at least one light guide is inside the at least one air guiding element, wherein the at least one third section adjoins the first section, and wherein the at least one third section has a light coupling-out surface at least in sections, and
wherein the at least one third section is coupled to the first section by a hinge and the at least one third section is pivotable about the pivot axis of the at least one air guiding element.

2. The air vent of claim 1, wherein the chamfer is arranged at an angle of 45° to the first and second sections of the at least one light guide respectively adjoining the chamfer.

3. The air vent of claim 1, wherein the at least one third section extends at least parallel to an inner periphery or an inner peripheral section of the wall of the at least one air guiding element.

4. The air vent of claim 1, wherein the inner air guiding element is pivotable relative to the at least one air guiding element and the housing about a second pivot axis, wherein the second pivot axis extends transversely to the direction of flow defined by the channel and perpendicularly to the pivot axis of the outer air guiding element.

5. The air vent of claim 1, wherein the at least one third section of the at least one light guide couples out light in a direction of an outside of the inner air guiding element.

6. An air vent for a vehicle, the air vent comprising:
a housing having a channel through which air can pass and be conveyed to an interior space of the vehicle;
at least one air guiding element, which is pivotable relative to the housing about a pivot axis extending transversely to a direction of flow defined by the channel;
at least one light source arranged outside the at least one air guiding element;
at least one light guide optically coupled to the at least one light source,
wherein a first section of the light guide is guided in a region of the pivot axis from the outside of the at least one air guiding element through a wall of the at least one air guiding element to an inside of the at least one air guiding element,
wherein in the first section the at least one light guide extends coaxially to the pivot axis, wherein a second section of the at least one light guide, which is outside the at least one air guiding element, adjoins the first section of the at least one light guide in a direction of the light source,
wherein the first section is arranged at an angle of 90° to the second section to form an angled portion,
wherein a chamfer is formed on an outer side of the angled portion, wherein the chamfer has a mirror surface directed towards an inner side of the angled portion, wherein the at least one air guiding element is a cylindrical outer air guiding element and the wall of the at least one air guiding element surrounds a wall of a cylindrical inner air guiding element, wherein
a further light guide is arranged on a side of the at least one air guiding element that is opposite the at least one light guide,
the further light guide is optically coupled to the at least one light source or to a further light source,
a first section of the further light guide is guided in the region of the pivot axis from the outside of the at least one air guiding element through the wall of the at least one air guiding element to the inside of the at least one air guiding element, and
the first section of the further light guide extends coaxially to the pivot axis.

7. An air vent for a vehicle, the air vent comprising:
a housing having a channel through which air can pass and be conveyed to an interior space of the vehicle;
at least one air guiding element, which is pivotable relative to the housing about a pivot axis extending transversely to a direction of flow defined by the channel;
at least one light source arranged outside the at least one air guiding element;
at least one light guide optically coupled to the at least one light source,
wherein a first section of the light guide is guided in a region of the pivot axis from the outside of the at least one air guiding element through a wall of the at least one air guiding element to an inside of the at least one air guiding element,
wherein in the first section the at least one light guide extends coaxially to the pivot axis, wherein a second section of the at least one light guide, which is outside the at least one air guiding element, adjoins the first section of the at least one light guide in a direction of the light source,
wherein the first section is arranged at an angle of 90° to the second section to form an angled portion,
wherein a chamfer is formed on an outer side of the angled portion, wherein the chamfer has a mirror surface directed towards an inner side of the angled portion, wherein the at least one air guiding element is a cylindrical outer air guiding element and the wall of the at least one air guiding element surrounds a wall of a cylindrical inner air guiding element, wherein
an inner side of the wall of the at least one air guiding element is mirrored,
the inner air guiding element is transparent, or
at least an outer side of the wall of the inner air guiding element is mirrored.

* * * * *